No. 844,200. PATENTED FEB. 12, 1907.
B. H. SKINNER.
CABLE HANGER.
APPLICATION FILED SEPT. 11, 1906.

WITNESSES
INVENTOR
Benjamin H. Skinner
BY Munn & Co
ATTORNEYS

United States Patent Office.

BENJAMIN H. SKINNER, OF CANTON, OHIO.

CABLE-HANGER.

No. 844,200. Specification of Letters Patent. Patented Feb. 12, 1907.

Application filed September 11, 1906. Serial No. 334,185.

*To all whom it may concern:*

Be it known that I, BENJAMIN H. SKINNER, a citizen of the United States, and a resident of Canton, in the county of Stark and State of Ohio, have invented a new and Improved Cable-Hanger, of which the following is a full, clear, and exact description.

This invention relates to means for suspending cables used for telephone or telegraph purposes from a supporting-wire; and the object thereof is to provide a hanger which is easy to secure in place, which may be shortened or elongated, as desired, and which is exceedingly simple in construction and inexpensive.

Reference is to be had to the accompanying drawings, forming a part of this specification, in which similar characters of reference indicate corresponding parts in all the figures, in which—

Figure 1:
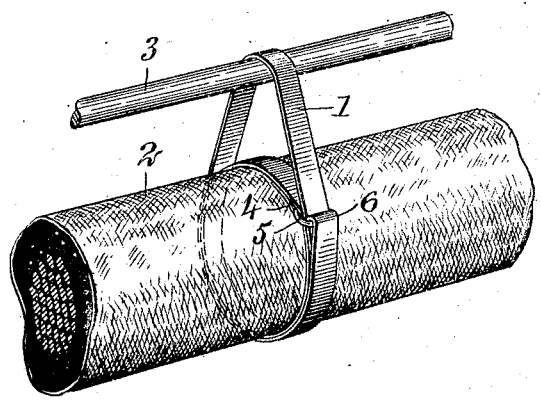
Figure 2:
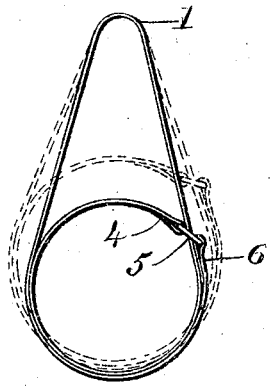

Figure 1 is a perspective view showing a portion of a cable and supporting-wire provided with my improved cable-hanger, and Fig. 2 is a side elevation of the hanger.

The specific form of hanger which I have illustrated in the drawings comprises a band of metal 1 of a length sufficiently great to encircle the cable 2 and to again also encircle the cable and supporting-wire 3 when spaced at the desired distance apart. One end 4 of the band is placed on one side of the cable, and from this point the band extends up over the cable and around to a point adjacent the end 4. Here it passes through a ring 5, secured to the end 4, and the band then passes up over the supporting-wire 3 and down around the cable to the ring where the end 6 of the band is secured. The ends of the band may be secured to the ring in any suitable manner, but preferably they extend through the ring from the upper side and are merely folded back under the part of the band adjacent the ring. When secured in this manner, it will be noted that the tighter the band is pulled the tighter will be the friction grip on the ends of the band, and there is no liability of the band loosening or becoming detached.

When it is desired to remove the band to take down the cable, all that is necessary is to bring the cable and supporting-wire closer together, and the end 6 of the band may be easily and instantly removed from the ring and from the supporting-wire as well. The distance between the cable and the supporting-wire may be adjusted at will by folding more or less of the end of the band back underneath the adjacent portion.

Having thus described my invention, I claim as new and desire to secure by Letters Patent—

1. A cable-hanger, comprising an imperforate metal band adapted to twice encircle the cable, and a metal ring through which the band passes and to which the ends of the band are secured.

2. A cable-hanger, comprising an imperforate metal band adapted to once encircle the cable and once encircle the cable and supporting-wire, and a metal ring through which the band passes and to which the ends thereof are secured.

3. A cable-hanger, comprising an imperforate metal band adapted to encircle the cable and also encircle the cable and supporting-wire, and a metal ring through which the band passes and to which the ends thereof are secured.

4. A cable-hanger, comprising an imperforate metal band adapted to encircle the cable and the supporting-wire, and a metal ring through which the band passes and to which the ends thereof are secured.

5. A cable-hanger, comprising a metal band adapted to encircle the cable and also encircle the cable and supporting-wire, and a metal ring through which the band passes and to which the ends of the band are secured by being passed downwardly through said ring and folded back beneath the parts of the band adjacent the ring.

6. In combination, a cable, a supporting-wire, an imperforate metal band encircling said cable and also encircling the cable and supporting-wire, and a metal ring through which the band passes and to which the ends thereof are secured, the ends of said band being inserted through said ring and held between the band and the cable.

In testimony whereof I have signed my name to this specification in the presence of two subscribing witnesses.

BENJAMIN H. SKINNER.

Witnesses:
N. S. WRIGHT,
E. M. SPIELBURG.